(12) United States Patent
Lauper et al.

(10) Patent No.: US 7,016,666 B2
(45) Date of Patent: Mar. 21, 2006

(54) METHOD FOR VERIFYING IN A MOBILE DEVICE THE AUTHENTICITY OF ELECTRONIC CERTIFICATES ISSUED BY A CERTIFICATION AUTHORITY AND CORRESPONDING IDENTIFICATION MODULE

(75) Inventors: Karin Busch Lauper, Bern (CH); Pierre-Alain Etique, Hinterkappelen (CH); Renato Cantini, Belfaux (CH)

(73) Assignee: Swisscom Mobile AG, Bern (CH)

( * ) Notice: Subject to any disclaimer, the term of this patent is extended or adjusted under 35 U.S.C. 154(b) by 525 days.

(21) Appl. No.: 10/100,894

(22) Filed: Mar. 18, 2002

(65) Prior Publication Data
US 2002/0098830 A1 Jul. 25, 2002

Related U.S. Application Data

(63) Continuation of application No. PCT/CH99/00605, filed on Dec. 15, 1999.

(51) Int. Cl.
*H04M 1/66* (2006.01)
(52) U.S. Cl. .................. 455/411; 455/410; 455/558
(58) Field of Classification Search ............ 455/411, 455/410, 558, 406, 90, 407
See application file for complete search history.

(56) References Cited

U.S. PATENT DOCUMENTS

| | | | |
|---|---|---|---|
| 5,586,166 A * | 12/1996 | Turban ................ 455/558 |
| 5,721,781 A * | 2/1998 | Deo et al. ............. 705/67 |
| 5,887,266 A | 3/1999 | Heinonen et al. |
| 6,115,601 A * | 9/2000 | Ferreira ............... 455/406 |
| 6,169,890 B1 * | 1/2001 | Vatanen ............... 455/406 |
| 6,253,322 B1 * | 6/2001 | Susaki et al. .......... 713/170 |
| 6,285,991 B1 * | 9/2001 | Powar ................. 705/76 |
| 6,415,142 B1 * | 7/2002 | Martineau ............ 455/411 |
| 6,584,326 B1 * | 6/2003 | Boydston et al. ....... 455/558 |
| 6,792,536 B1 * | 9/2004 | Teppler ............... 713/178 |
| 6,799,155 B1 * | 9/2004 | Lindemann et al. ..... 703/24 |
| 6,799,177 B1 * | 9/2004 | Fai et al. .............. 707/9 |
| 2001/0044321 A1 * | 11/2001 | Ausems et al. ......... 455/556 |
| 2003/0075599 A1 * | 4/2003 | Takatsuki et al. ....... 235/380 |
| 2003/0203732 A1 * | 10/2003 | Eerola ................. 455/422.1 |
| 2004/0077334 A1 * | 4/2004 | Joyce et al. ........... 455/406 |
| 2004/0185830 A1 * | 9/2004 | Joao et al. ............. 455/410 |
| 2004/0199474 A1 * | 10/2004 | Ritter ................. 705/65 |
| 2004/0215964 A1 * | 10/2004 | Barlow et al. ......... 713/172 |

* cited by examiner

FOREIGN PATENT DOCUMENTS

WO   WO 97/40616   10/1997

OTHER PUBLICATIONS

Park, "On Certificate-Based Security Protocols for Wireless Mobile Communication Systems", IEEE Network: The Magazine of Computer Communications, Bd. 11, Nr. 5, Sep. 1, 1997, Seiten 50-55, XP000699941 New York, U.S.A.

*Primary Examiner*—George Eng
*Assistant Examiner*—Dai Phuong
(74) *Attorney, Agent, or Firm*—Pearne & Gordon LLP

(57) ABSTRACT

Method for verifying in a mobile device (13) the authenticity of electronic partner certificates issued by a certification authority. Said mobile device (13) has an identification module (16) (SIM or WIM). Said issued certificates are verified with the certificate of the certification authority.

A reference to said electronic certificate of the certification authority is stored in a second module (14) that is connected with said mobile device (13).

Advantages: the second module can be distributed independently from the first module and from the mobile device.

24 Claims, 8 Drawing Sheets

METHOD FOR VERIFYING IN A MOBILE DEVICE THE AUTHENTICITY OF ELECTRONIC CERTIFICATES ISSUED BY A CERTIFICATION AUTHORITY AND CORRESPONDING IDENTIFICATION MODULE

This application is a continuation of international application PCT/CH99/00605 filed on Dec. 15, 1999.

FIELD OF THE INVENTION

The present invention concerns a method for verifying electronic certificates in mobile devices and a corresponding identification module.

RELATED ART

Asymmetrical cryptographic methods that can be used for authenticating communication partners in a mobile radio network, for example in a GSM network, are already known. Such methods are based for example on the RSA algorithm.

FIG. 1 shows diagrammatically an authentication process. When the first entity 1 wants to authenticate a second entity 2, for example a communication partner, it must invite this second entity to prove that it has a private key. Although the private key is known only to the second entity, 1 has 2's public key, with which it can check that 2 has used 2's private key.

In order to prove this, the entity 2 can for example encode a random number 3 of 1 (challenge) that is known to both parties. Typically, the random number is generated by 1 and sent to 2; 1 expects 2 to sign this random number with its private key and reply with this signature 4. The signature 4 can then be verified by 1 with 2's public key.

The challenge can also be implicitly known to both parties, so that only the second message 4 needs to be sent. If both entities 1, 2 have a synchronized clock, time can be used as a challenge. It is important most of all that a challenge 3 be never used twice.

The first entity 1 can also use the public key of the second entity 2 for encoding data that can only be decoded with 2's private key. In this manner, session keys (or data elements that then enable to derive a session key) can for example be encoded by 1 and sent to 2. If 2 later uses this session key to encode data with a symmetrical algorithm, it also proves that it does indeed have the private key needed for decoding this session key; it is thus also authenticated. The session key can for example be used during a session.

Of course, 2 can also authenticate 1 with this mechanism and with 1's pair of keys.

The first entity 1 must be sure that the public key it uses belongs in fact to the entity 2. In order to make the authenticity of this key verifiable, it is possible to use certificates issued by a certification authority (CA).

FIG. 2 shows an example of such an encoding certificate 5. The certificate 5 is an electronic document that usually comprises, in addition to the user's public key 51, also his name 50 and the name of the certification authority 52 that has issued the certificate. With a hash function 6, the hash value 7 for example of the parameters 50, 51, 52 is determined; this value 7 is then signed by the certification authority with the certification authority's private key 8 on the basis of an asymmetrical cryptographic algorithm 9, for example RSA, and the signature 53 is copied in the certificate 5.

Every third party can then verify with the certification authority's public key 12 whether the digital signature 53 has really been issued by the certification authority 8 (FIG. 3). For this purpose, the hash value 7 of the parameters 50 to 52 must be determined and compared with the hash value 10 determined from the signature 53 with the certification authority's public key 12. If both hash values are the same and if the certification authority can be trusted, the certificate 5 can be considered genuine. A third party having the certification authority's public key 12 can verify in this manner whether the public key 51 indicated in the certificate 5 does indeed belong to the identified partner.

One thus returns to the original problem: how can one be sure that the public key 12 one has belongs in fact to the certification authority and has not been falsified? For this purpose, at least one public key is needed that one can trust and that can be used for verifying all other certificates.

Such an "original key" can for example be stored in a self-signed "certificate of origin". The public key indicated in the certificate of origin can be used for verifying this certificate of origin.

It is an aim of this invention to propose a new method for distributing such "certificates of origin" to users of mobile devices, in particular of mobile radio telephones.

In the computer field, it is already known to store a list of certificates of origin of various certification authorities in commercial browsers. A computer user who installs a browser on his computer thus automatically copies this list of certificates. If however the browser was copied from an untrustworthy source, for example over the Internet, it cannot be excluded that this list has been falsified. Furthermore, new certificates of origin can be added after the browser's installation only with much effort.

If a certification authority wants to make its certificates known quickly and widely through this distribution method, it must negotiate with each browser production firm in order for the certificates to be copied in the new versions of each browser. It can however take months or even years for a wide number of users to have installed a browser version.

It has also been suggested to store certificates of origin in the mobile device itself. It is, however, even more difficult for a certification authority to distribute a certificate quickly in many mobile devices of various manufacturers.

Electronic certificates have additionally been copied in stored memory areas of SIM cards. Thus, certification authorities become dependent on SIM card producers. Furthermore, mobile users are not readily willing to replace their personal SIM cards, in which also personal data such as telephone number lists are stored, only to update their list of certificates.

An aim of the invention is to propose a new distribution system that allows a quick distribution of certificates.

It is a further aim to propose a new method for verifying in a mobile device electronic certificates issued by a certification authority.

BRIEF SUMMARY OF THE INVENTION

According to the present invention, these aims are achieved in particular through the characteristics of the independent claims. Further advantageous embodiments are moreover described in the dependent claims and in the description.

In particular, these aims are achieved through a method in which a reference to the electronic certificate of the certification authority ("certificate of origin") is stored in a second module of the mobile device.

The second module can for example consist of a second chip-card that can be inserted next to the first chip-card in a second card-slot of a dual-slot mobile device.

This has the advantage that electronic certificates can be distributed quickly and easily by offering new modules. Mobile users who need such a new certificate, for example to use a new secured application or to communicate with a new partner, can install it very easily by simply inserting a new module in their mobile device.

DESCRIPTION OF THE DRAWINGS

Hereafter, preferred embodiments of the invention will be described in more detail with the aid of the attached drawing.

The above-described

The above-described

The above-described

DETAILED DESCRIPTION OF THE INVENTION

Although this invention describes in several details the special case of the embodiment in a GSM mobile radio network, the one skilled in the art will understand that this method can also be used with other types of radio networks, for example with AMPS, TDMA, CDMA, TACS, PDC, HSCSD, GPRS, EDGE or UMTS mobile radio networks, in particular with WAP (Wireless Application Protocol) capable mobile radio networks. This invention can additionally be used in other networks, in particular in the Internet.

Figure 4:
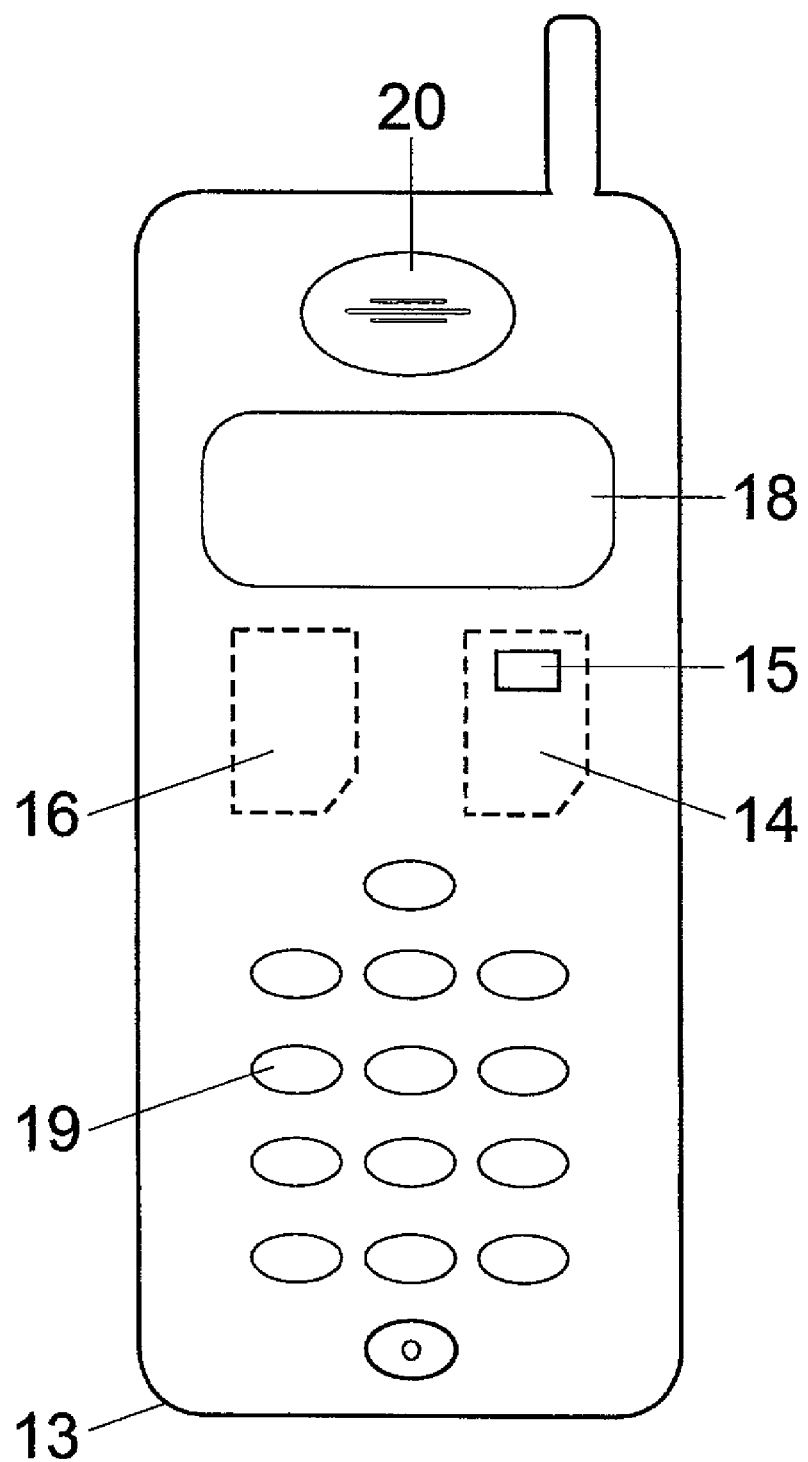
FIG. 4 shows a dual-slot mobile device.

FIG. 4 shows a mobile device 13, in this example a mobile radio telephone that can be used for the invention. This device has input means 19 (here a keyboard), reproduction means 18 and 20 (here a LCD and a loudspeaker), a slot for a conventional identification module, for example a SIM (Subscriber Identification Module) card, a SIM module or a SIM/WIM card (WAP Identification Module) 16, as well as a slot for a second module 14, for example in the form of a chip-card, for example in a Plug-In or preferably in the ISO format. Both modules 16, 14 can simultaneously be inserted in the mobile device 13 and can communicate over an interface with data processing means (not represented) in the mobile device 13.

Dual-slot mobile radio telephones 13 are as such already known. The present invention can however also be used with other types of mobile devices having two module readers. For example, this invention can also be used with computers, for example with laptops or palmtops having two module readers, for example two chip-card readers.

The first module 16 is preferably realized as a removable chip-card, for example in Plug-In or ISO format and comprises a secured memory area (not represented) in which a user identification is stored, for example an IMSI (International Mobile Subscriber Identity) identification in a GSM mobile radio network. A personal certificate of the user can also be contained in the EEPROM of the first module 16. The first module could also be realized in the form of another data carrier, for example an optical, magnetic and/or semi-conductor data carrier, for example as a ROM or EPROM module. The first module could even be realized as software module within a secured memory area of the mobile device 13.

The second module 14 according to the invention is removable and can be commercialized and distributed independently from the mobile device 13 and from the first module 16, for example directly through a certification authority, for example a financial institute, a telecommunication network operator, etc.

Preferably, the second module is also realized as a chip-card, preferably in the convenient ISO format. In further embodiments, this module could, however, also be realized in the form of another data carrier, for example of an optical, magnetic and/or semi-conductor data carrier, for example as a ROM or EPROM module.

The second module 14 comprises a secured memory area 15 in which at least one certificate or a reference to a certificate is stored, preferably a certificate of origin with which other certificates can be verified. This certificate is preferably stored during the manufacture of the second module 14, for example defined in a ROM area of the module 14. In a variant embodiment, this certificate can be stored during the personalization of the second module by the certification authority 14.

Figure 1:
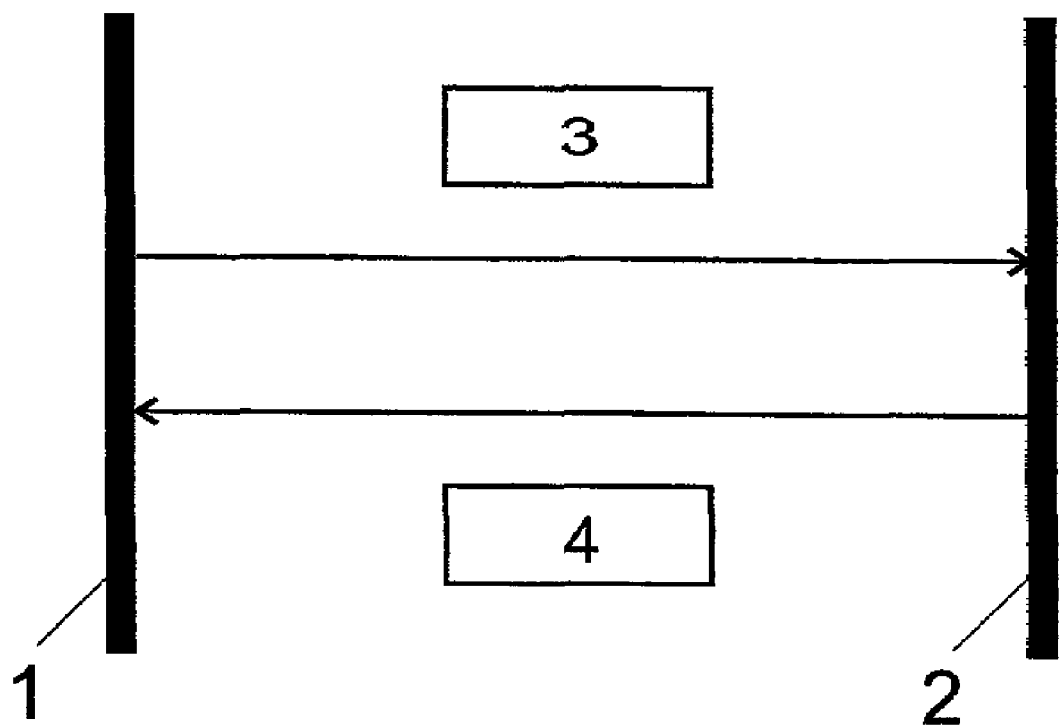
FIG. 1 shows an authentication diagram based on asymmetrical cryptography.
Figure 2:
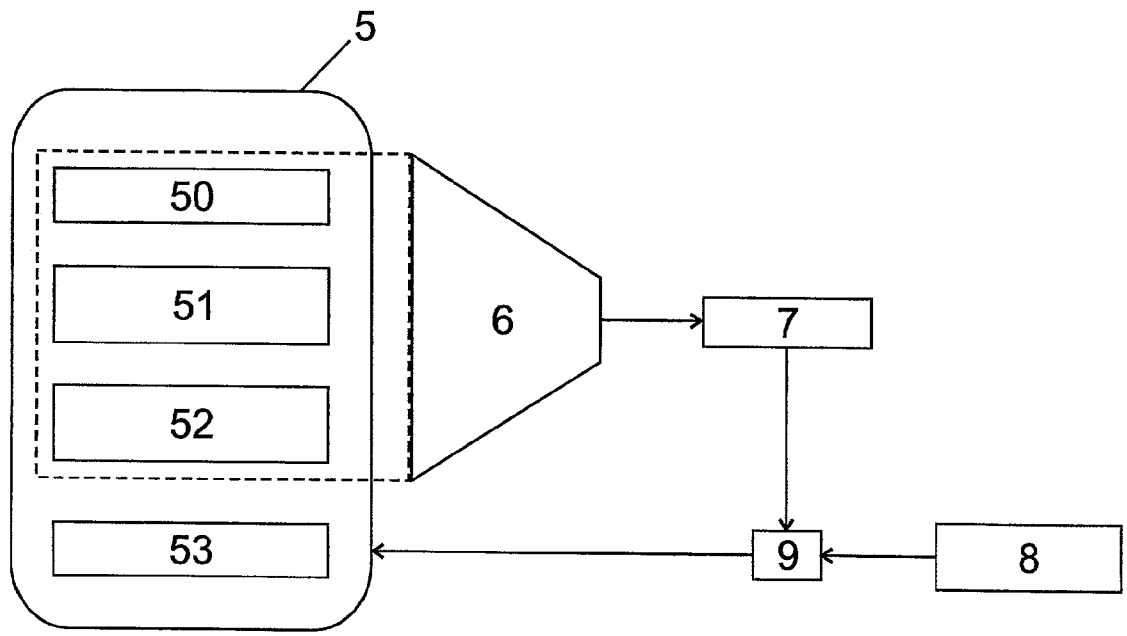
FIG. 2 shows diagrammatically the issuing of a key certificate.
Figure 3:
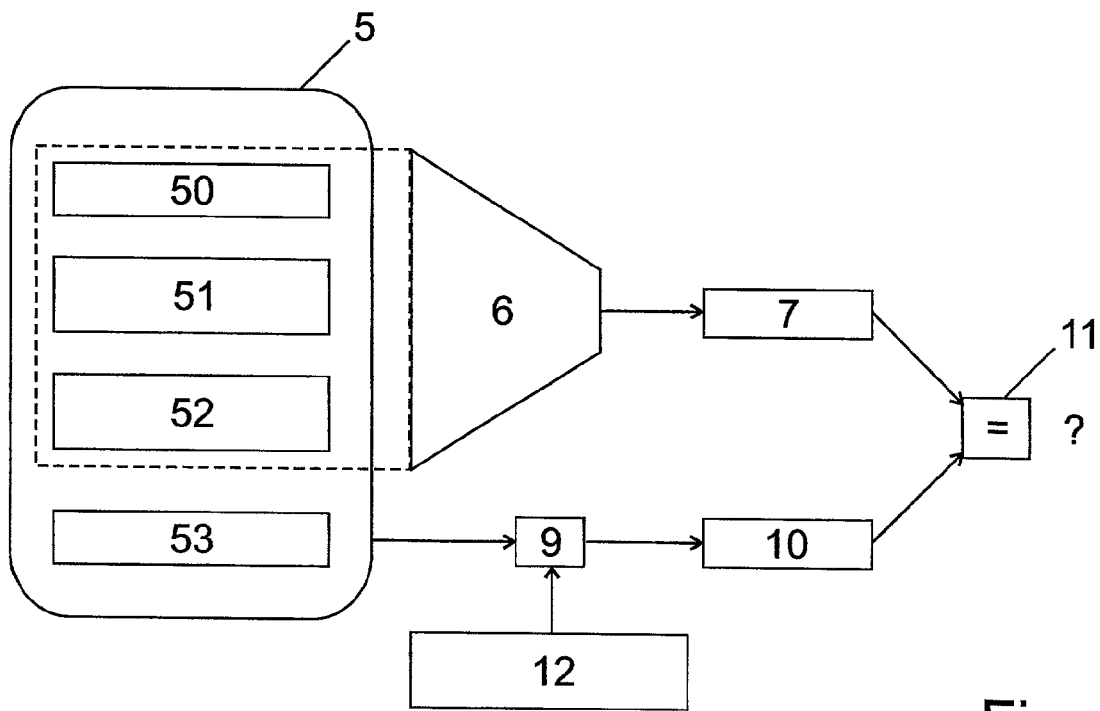
FIG. 3 shows diagrammatically the verifying of a certificate.

In the memory area 15 of the second module, a complete certificate 5 of the certification authority can for example be stored, as represented by way of example in FIGS. 2 and 3. In a variant embodiment, only a reference to such a certificate is stored instead, for example a hash of the certificate, an address, for example a URL address of a certificate stored elsewhere, the serial number of the certification authority, etc. Hereafter, in the description and in the claims, the expression "reference to the certificate" means either the certificate itself or another data that allows this certificate to be found.

Additionally, lists of certificates or of certificates of origin can be contained in the second module 14.

The second module 14 can also fulfill other functions than the verification of certificates, for example payment transaction functions. In a variant embodiment, the second module 14 can be used for example also as money card, for example as credit, debit and/or prepaid card. If the second module 14 is offered by a credit card institute or by a financial institute, the certificate or a reference to the certificate of this institute can be stored in the module.

The second module 14 can even be a multi-functional chip-card, for example a JavaCard (trademark of Sun) or an OpenCard (trademark of IBM), allowing several applications to be assisted as applet or as program.

The certificate stored in the second module 14 can be used by the mobile device 13, respectively by applications in this mobile device 13 and/or in the first module 16 to verify digital signatures. For example, this certificate can be used by security functions of the WTLS protocol in a WAP (Wireless Application Protocol) browser to authenticate the certificates of partners issued by a certification authority.

Figure 5:
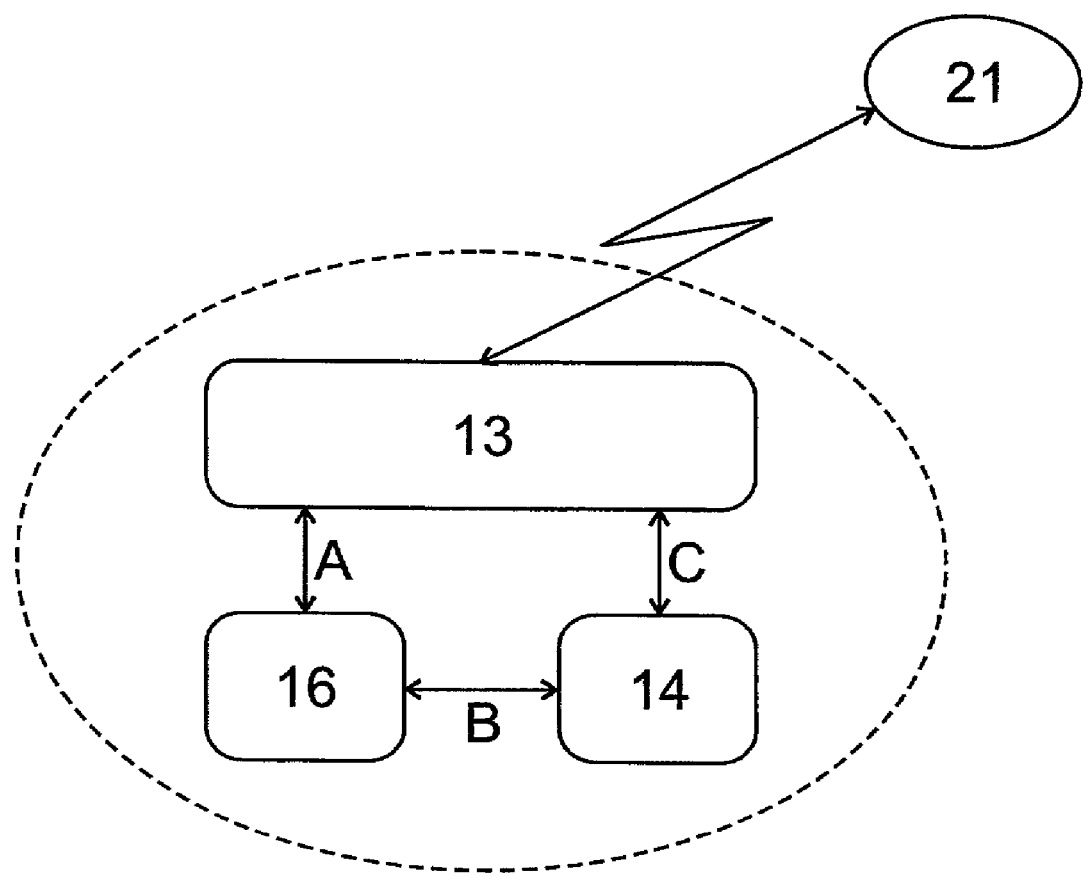
FIG. 5 shows the same dual-slot mobile device diagrammatically.

FIG. 5 shows diagrammatically the possible data flows A, B, C between the first module 16, the second module 14 and the mobile device 13 (ME—Mobile Equipment) communicating over a mobile radio network with a distant partner 21, for example a service provider. The mobile device 13, respectively an application in this mobile device or in the first module 16, wants to authenticate the distant partner 21, for example by using the WTLS protocol. For this purpose, this application must use the certificate of origin in the second module 14. This can occur in two modes:

In a first embodiment, the second module is used purely as memory. In this embodiment, the certificate of origin 5 is stored in said memory area of the second module and can be retrieved by the mobile device 13 and/or by the first module 16 to verify the certificate of the partner 21.

In a second embodiment, the second module has its own data processing means (computer throughput) with which these verifications can be performed. In this embodiment, the mobile device 13 and/or the first module 16 forwards the certificate received from the partner 21 to the second module for verification. The second module verifies the partner certificate and returns as a result an authentication confirmation, a non-authentication confirmation or preferably more subtle messages.

If the application executor, for example the application that wants to verify a certificate, is located in the mobile device 13, the communication with the second module can occur either directly (arrow C) or through the first module 16 (arrows A and B) (provided, in the case of a reference to a certificate, that the certificate is retrieved (steps not represented)).

Four different messages can be used to verify the certificate of a partner 21:
1. Read_CA_Cert_Request: requests a copy of the certificate of origin (or a reference to this certificate).
2. Read_CA_Cert_Reply: sends the certificate of origin as reply (or a reference to this certificate).
3. Check_Partner_Cert_Request: sends the partner certificate (or a reference to this certificate).
4. Check_Partner_Cert_Reply: sends the result of the verification of the certificate (certificate authenticated/not authenticated).

Various embodiments of the method according to the invention will now be described in more detail on the basis of the FIGS. 6 to 13.

Figure 6:
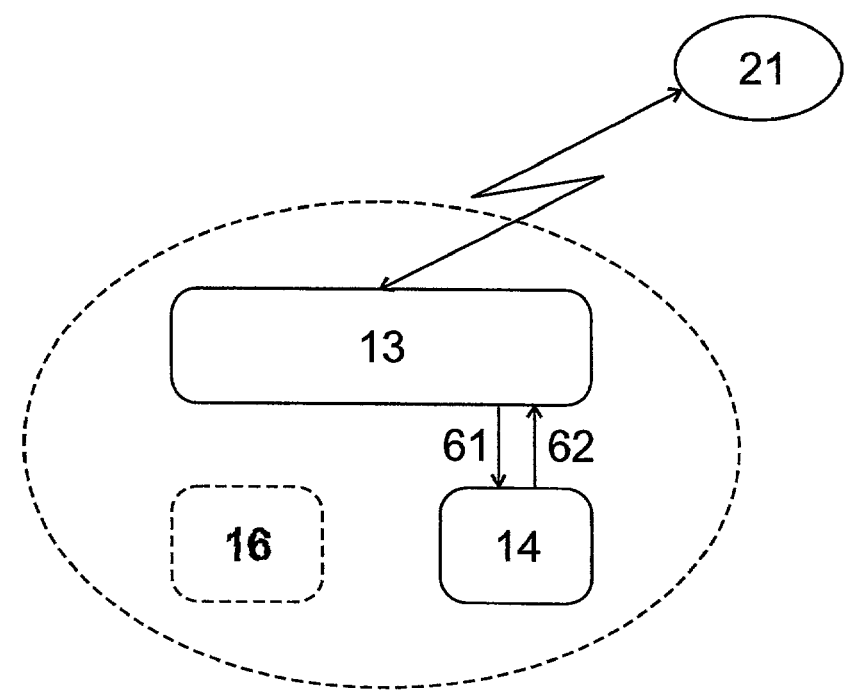
FIGS. 6 to 13 show diagrammatically the communication flow between the mobile device and the two modules in eight different embodiments of the invention.

In the variant embodiment represented in FIG. 6, the application executor, for example a WTLS application, is located in the mobile device 13 and communication between the mobile device 13 and the second module 14 takes place directly over the channel C. The second module 14 is used only as memory.

In this embodiment, the mobile device 13 first sends a Read_CA_Cert_Request (arrow 61) to the second module 14 which replies with the stored certificate, or with the stored reference, through a Read_CA_Cert_Reply (arrow 62). This certificate (or the corresponding reference) can then be used by an application in the mobile device to verify the certificate of a partner 21.

Figure 7:
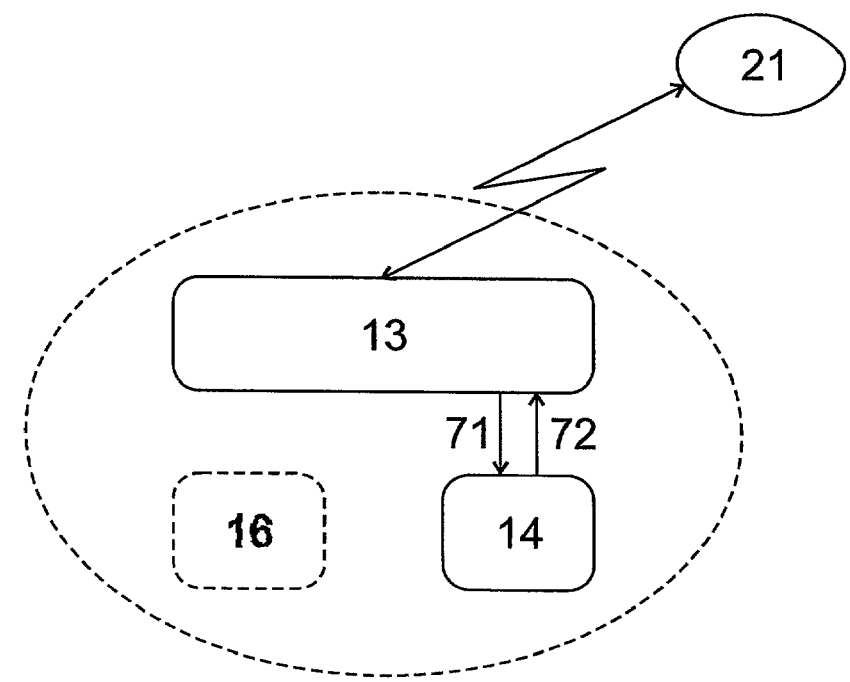

In the variant embodiment represented in FIG. 7, the application executor, for example a WTLS application, is located in the mobile device 13 and communication between the mobile device 13 and the second module 14 takes place directly over the channel C. Contrary to the embodiment of FIG. 6, the second module, however, has data processing means with which it can itself verify a certificate.

In this embodiment, the mobile device 13 first sends a Check_Partner_Cert_Request (arrow 71) to the second module 14. This request contains a partner certificate (possibly retrieved in advance). The second module replies with the result of the performed verification through a Check_Partner_Cert_Reply (arrow 72).

Figure 8:
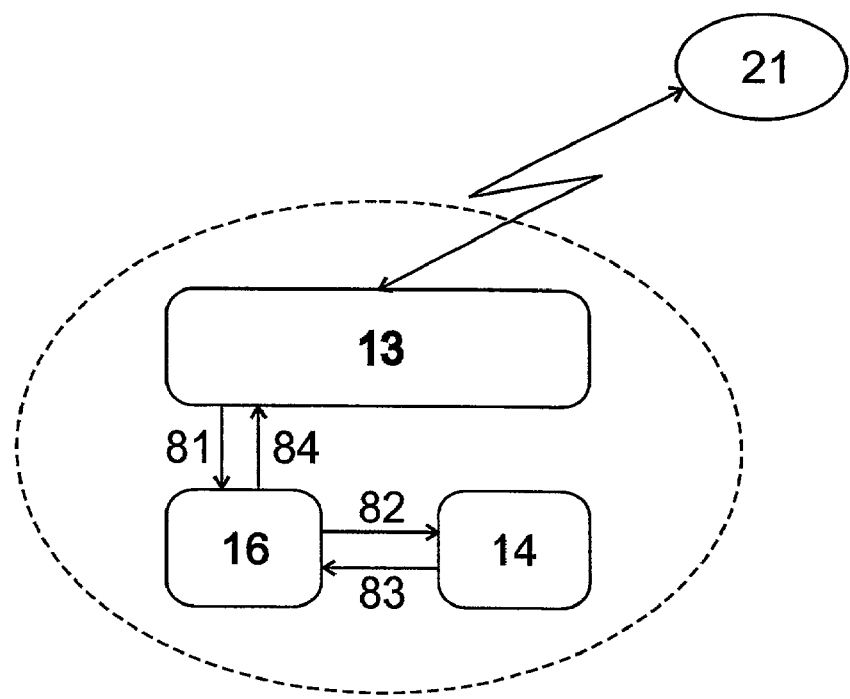

In the variant embodiment represented in FIG. 8, the application executor, for example a WTLS application, is located in the mobile device 13. Communication with the second module 14, however, takes place through the first module 16 (SIM or WIM) (arrows A and B in FIG. 5). The second module 14 is used only as memory.

In this embodiment, the mobile device 13 first sends a Read_CA_Cert_Request (arrow 81) to the first module 16 which forwards this request to the second module 14 (arrow 82). The second module 14 replies with the stored certificate of origin or with the reference through a Read_CA_Cert_Reply (arrow 83); the first module forwards the received certificate or reference to the mobile device 13 (arrow 84) which can use this certificate of origin to verify the certificate of the partner 21.

Figure 9:
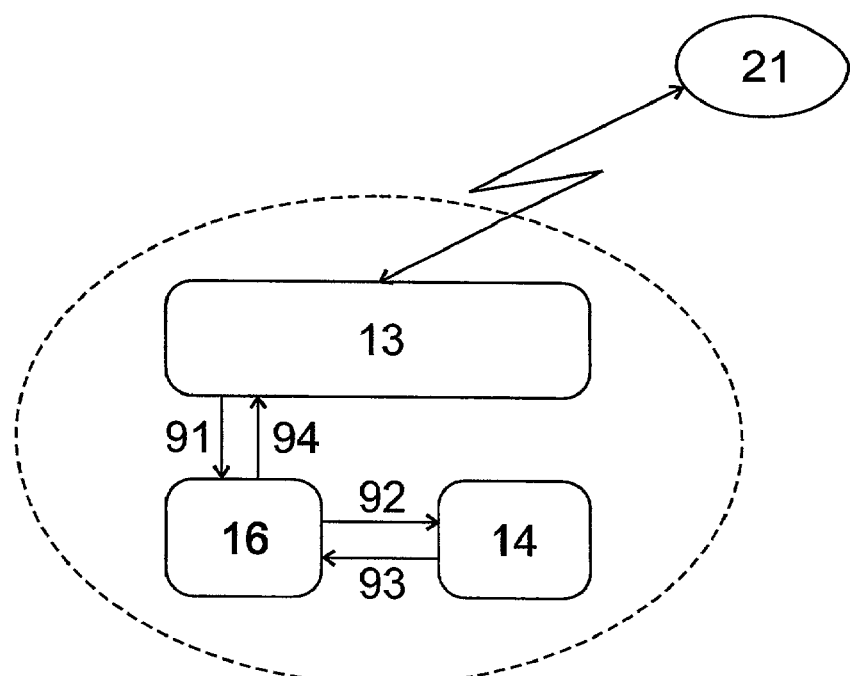

In the variant embodiment represented in FIG. 9, the application executor, for example a WTLS application, is located in the mobile device 13. Communication with the second module 14 also takes place through the first module 16 (SIM or WIM). Contrary to the embodiment of FIG. 8, the second module however has data processing means with which it can itself verify a certificate.

In this embodiment, the mobile device 13 first sends a Check_Partner_Cert_Request (arrow 91) to the first module 16. This request contains the partner certificate (possibly retrieved in advance), or a reference to a partner certificate, with which the second module can retrieve the certificate over the terminal 13 and possibly over the first module 16. The first module then forwards this request to the second module 14 (arrow 92). The second module 14 verifies the received certificate and returns the result of the verification to the first module 16 (arrow 93, Check_Partner_Cert_Reply). The first module forwards the received result to the mobile device 13 (arrow 94).

Figure 10:
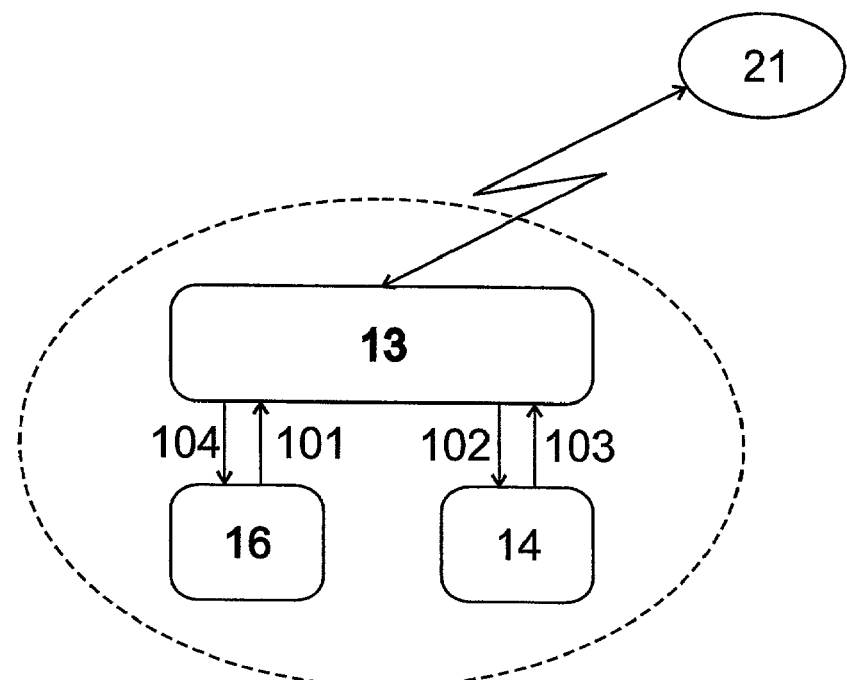

In the variant embodiment represented in FIG. 10, the application executor, for example a WTLS application, is located in the first module 16. Communication between the first and the second module 14 takes place through the mobile device 13 (arrows A and C in FIG. 5). The second module 14 is used only as memory.

In this embodiment, the first module 16 first sends a Read_CA_Cert_Request to the mobile device 13 (arrow 101) which forwards this request to the second module 14 (arrow 102). The second module replies with the stored certificate of origin or with a reference to the certificate of origin through a Read_CA_Cert_Reply (arrow 103) that is forwarded to the first module (arrow 104). The verification of the partner certificate with the certificate of origin takes place in the first module 16.

Figure 11:
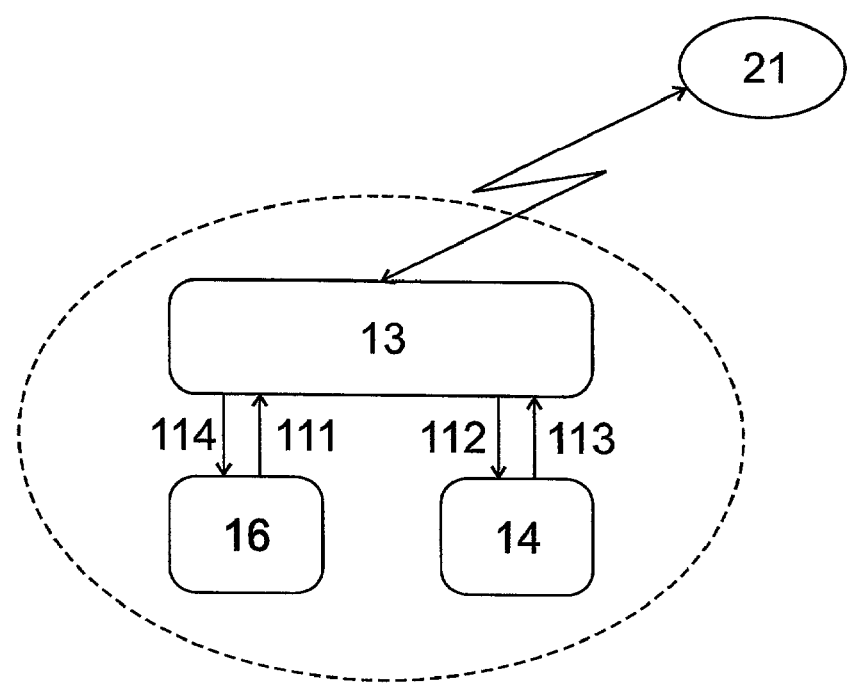

In the variant embodiment represented in FIG. 11, the application executor, for example a WTLS application, is located in the first module 16. Communication between the first and the second module 14 takes place through the mobile device 13 (arrows A and C in FIG. 5). Contrary to the embodiment of FIG. 10, the second module 14, however, has data processing means with which it can itself verify a certificate.

In this embodiment, the first module 16 first sends a Check_Partner_Cert_Request to the mobile device 13 (arrow 111). This request contains a partner certificate (possibly retrieved in advance). The mobile device forwards this request to the second module 14 (arrow 112). The second module verifies the received partner certificate and returns the result through a Check_Partner_Cert_Reply (arrow 113). This result is forwarded by the mobile device to the first module (arrow 114).

Figure 12:
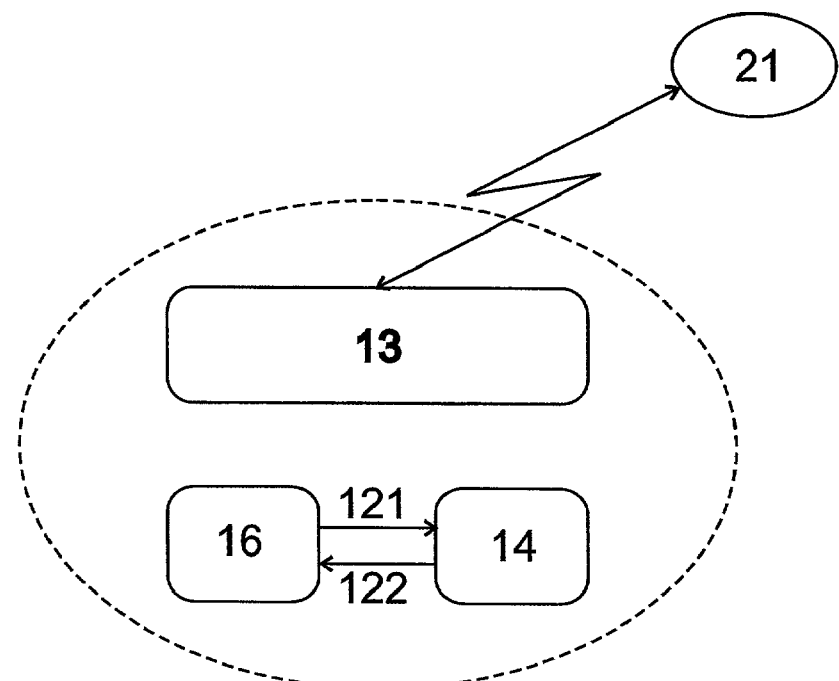

In the variant embodiment represented in FIG. 12, the application executor, for example a WTLS application, is located in the first module 16. Communication between the first and the second module 14 can take place directly (arrow B in FIG. 5). The second module 14 is used only as memory.

In this embodiment, the first module 16 first sends a Read_CA_Cert_Request (arrow 121) to the second module 14 which replies with the stored certificate or with the reference through a Read_CA_Cert_Reply (arrow 122).

Figure 13:
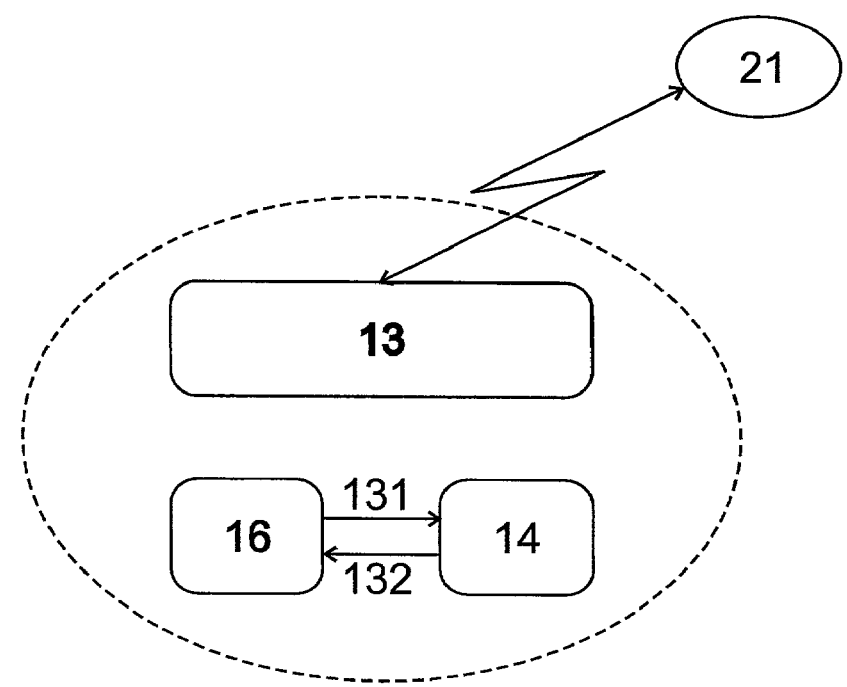

In the variant embodiment represented in FIG. 13, the application executor, for example a WTLS application, is located in the first module 16. Communication between the first and the second module 14 can take place directly (arrow B in FIG. 5). Contrary to the embodiment of FIG. 12, the second module, however, has data processing means with which it can itself verify a certificate.

In this embodiment, the first module 16 first sends a Check_Partner_Cert_Request (arrow 131) to the second module 14. This request contains a partner certificate (possibly retrieved in advance), or a reference to a partner certificate, with which the second module can retrieve the certificate over the terminal 13 and possibly over the first module 16. The second module replies with the result of the performed verification through a Check_Partner_Cert_Reply (arrow 132).

The one skilled in the art will understand that other data flows are possible within the framework of the invention. For example, the certificate of origin stored in the second module 14 can also be used in order to authenticate other certificates in the first module 16 (for example the mobile user certificate) in the mobile device 13 and/or in external devices connected with the mobile device 13 over a contactless interface at close range (for example according to BlueTooth, HomeRF and/or IrdA), for example POS (Point-of-Sales).

What is claimed is:

1. A method for verifying, in a mobile device, the authenticity of electronic certificates issued by a certification authority, said mobile device having an identification module and a second module, said method comprising the steps of:
   storing, in the second module, either the self-signed electronic certificate of the certification authority or data with which said self-signed electronic certificate can be found; and
   authenticating the issued electronic certificates with a self-signed electronic certificate of the certification authority.

2. The method of claim 1 further comprising the step of copying said electronic certificate of the certification authority in said mobile device, and wherein the authentication of said issued certificate takes place in the mobile device.

3. The method of claim 1, wherein said second module has data processing means and wherein said data processing means performs the authenticating step.

4. The method of claim 1, wherein said second module is a chip-card.

5. The method of claim 4, wherein said identification module is inserted into a first slot in said device, and further wherein said chip-card is inserted into a second slot of said device different than said first slot, in order to connect with the mobile device.

6. The method of claim 5, wherein said chip-card has an ISO format.

7. The method of claim 1, wherein one of said authenticated certificates is used by a browser in said mobile device.

8. The method of claim 1, wherein one of said authenticated certificates is used by an application in said identification module.

9. The method of claim 1, further comprising the step of copying said certificate of the certification authority in said identification module, and wherein the authentication of said issued certificate takes place in the identification module.

10. The method of claim 1, wherein said mobile device is a WAP-capable mobile radio telephone.

11. The method of claim 1, wherein said electronic certificate of the certification authority is store in said second module.

12. The method of claim 1, wherein said data with which this certificate can be found corresponds to an address of the certificate of this certification authority.

13. The method of claim 12, wherein said address is a URL address.

14. A system comprising:
   a dual-slot mobile device,
   an identification module in the first slot, and
   a second module in the second slot for storing either the self-signed electronic certificate of a certification authority or data with which this self-signed electronic certificate can be found, wherein
   a certificate is authenticated with said self-signed electronic certificate of the certification authority.

15. The system of claim 14, wherein the certificate of a certification authority is stored in said second module.

16. The system of claim 14, wherein said data with which this certificate can be found is stored in said second module.

17. The system of claim 14, wherein said address is a URL address.

18. The system of claim 14, wherein said second module has data processing means for the authentication of a partner certificate.

19. The system of claim 14, wherein the second module has execution means for payment transaction functions.

20. The system of claim 19, wherein said second module is in the form of a money card.

21. The system of claim 14, said second module being in the form of a chip-card.

22. The system of claim 14, wherein said data with which the self-signed electronic certificate can be found corresponds to an address of the self-signed electronic certificate of the certification authority.

23. A certificate module for installation in a device having a first slot, a second slot, and an identification module in the first slot, said certificate module comprising:
   means for storing either the self-signed electronic certificate of a certification authority or data with which this self-signed certificate can be found; and
   means for inserting said certificate module into said second slot, wherein
   said device or an application in one of the device or the first module authenticates an issued certificate using the self-signed certificate of the certification authority.

24. The certificate of claim 23, wherein one or both of said identification module and said certificate module includes means for authenticating the issued certificate using the self-signed certificate of the certification authority.

* * * * *

UNITED STATES PATENT AND TRADEMARK OFFICE
CERTIFICATE OF CORRECTION

| | |
|---|---|
| PATENT NO. | : 7,016,666 B2 |
| APPLICATION NO. | : 10/100894 |
| DATED | : March 21, 2006 |
| INVENTOR(S) | : Lauper et al. |

It is certified that error appears in the above-identified patent and that said Letters Patent is hereby corrected as shown below:

Col. 7, Claim 1, please delete as printed and insert:

-- A method for verifying, in a mobile device, the authenticity of electronic certificates issued by a certification authority, said mobile device having an identification module and a second module, said method comprising the steps of:

storing, in the second module, either the self-signed electronic certificate of the certification authority or data with which said self-signed electronic certificate can be found; and.

authenticating the issued electronic certificates with a self-signed electronic certificate of the certification authority, wherein said issued electronic certificates are used for verifying the authenticity of another item and/or entity.--

UNITED STATES PATENT AND TRADEMARK OFFICE
CERTIFICATE OF CORRECTION

PATENT NO. : 7,016,666 B2
APPLICATION NO. : 10/100894
DATED : March 21, 2006
INVENTOR(S) : Lauper et al.

It is certified that error appears in the above-identified patent and that said Letters Patent is hereby corrected as shown below:

Col. 8, Claim 14, please delete as printed and insert:

--A system comprising:

a dual-slot mobile device, an identification module in the first slot, and a second module in the second slot for storing either the self-signed electronic certificate of a certification authority or data with which this self-signed electronic certificate can be found, wherein a certificate is authenticated with said self-signed electronic certificate of the certification authority, wherein said issued electronic certificates are used for verifying the authenticity of another item and/or entity.--

Col. 8, Claim 17, please delete "The system of claim 14" and insert --The system of claim 22--.

UNITED STATES PATENT AND TRADEMARK OFFICE
CERTIFICATE OF CORRECTION

PATENT NO. : 7,016,666 B2
APPLICATION NO. : 10/100894
DATED : March 21, 2006
INVENTOR(S) : Lauper et al.

It is certified that error appears in the above-identified patent and that said Letters Patent is hereby corrected as shown below:

Col. 8, Claim 23 please delete as printed and insert:

--A certificate module for installation in a device having a first slot, a second slot, and an identification module in the first slot, said certificate module comprising:

means for storing either the self-signed electronic certificate of a certification authority or data with which this self-signed certificate can be found; and means for inserting said certificate module into said second slot, wherein said device or an application in one of the device or the first module authenticates an issued certificate using the self-signed certificate of the certification authority, wherein said issued electronic certificates are used for verifying the authenticity of another item and/or entity.--

Signed and Sealed this

Seventeenth Day of October, 2006

JON W. DUDAS
*Director of the United States Patent and Trademark Office*